(12) United States Patent
Jiang

(10) Patent No.: US 11,109,379 B2
(45) Date of Patent: Aug. 31, 2021

(54) METHOD AND APPARATUS FOR CONFIGURING CHANNEL CARRIER, USER EQUIPMENT AND BASE STATION

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 80 days.

(21) Appl. No.: 16/666,076

(22) Filed: Oct. 28, 2019

(65) Prior Publication Data

US 2020/0068571 A1 Feb. 27, 2020

Related U.S. Application Data

(63) Continuation of application No. PCT/CN2017/082389, filed on Apr. 28, 2017.

(51) Int. Cl.
*H04W 72/04* (2009.01)
*H04W 72/14* (2009.01)

(52) U.S. Cl.
CPC ..... *H04W 72/0453* (2013.01); *H04W 72/042* (2013.01); *H04W 72/14* (2013.01)

(58) Field of Classification Search
None
See application file for complete search history.

(56) References Cited

U.S. PATENT DOCUMENTS

| 8,638,815 | B2 | 1/2014 | Earnshaw et al. | |
|---|---|---|---|---|
| 8,861,458 | B2 | 10/2014 | Dai et al. | |
| 2014/0128092 | A1* | 5/2014 | Xiong | H04W 88/06 455/454 |
| 2018/0310308 | A1* | 10/2018 | Loehr | H04W 72/10 |
| 2019/0200401 | A1* | 6/2019 | Chang | H04L 29/06 |
| 2019/0246414 | A1* | 8/2019 | Yang | H04L 5/0053 |

FOREIGN PATENT DOCUMENTS

| CN | 101902817 A | 12/2010 |
|---|---|---|
| CN | 102123512 A | 7/2011 |
| CN | 105610558 A | 5/2016 |
| EP | 3576480 A1 | 12/2019 |

(Continued)

OTHER PUBLICATIONS

International Search Report Issued in PCT Application No. PCT/CN2017/082389, dated Oct. 9, 2017, WIPO, (5p).

(Continued)

*Primary Examiner* — Saba Tsegaye
(74) *Attorney, Agent, or Firm* — Arch & Lake LLP

(57) ABSTRACT

A method and an apparatus for configuring a channel carrier, user equipment and a base station are provided. The method of configuring a channel carrier includes: a message carrying channel carrier configuration information sent by a base station is received, where the channel carrier configuration information indicates at least one of numerology or TTI configuration information for a logical channel; and each carrier mapped to the logical channel and at least a numerology or a TTI configured for each carrier mapped to the logical channel are determined based on the channel carrier configuration information.

22 Claims, 9 Drawing Sheets

(56) References Cited

FOREIGN PATENT DOCUMENTS

| WO | 2016163663 A1 | 10/2016 |
|---|---|---|
| WO | 2017004757 A1 | 1/2017 |
| WO | 2018128431 A1 | 7/2018 |

OTHER PUBLICATIONS

Nokia et al, "Report of email discussion on [96#28] [NR] MAC to support multiple 1-34 numerologies 3GPP TSG-RAN WG2 NR Adhoc, R2-1700250" Jan. 6, 2017, (19p).

Ericsson, "Impact of mixed numerologies on UEs in idle mode" 3GPP TSG-RAN WG2 Meeting #97, Tdoc R2-1700854, Feb. 4, 2017, (3p).

European Patent Office, Extended European Search Report Issued in Application No. 17907685.6, dated Apr. 14, 2020, Germany, 14 pages.

Samsung, "HARQ-ACK Feedback for Numerology Multiplexing", 3GPP TSG RAN WG1#88bis, Spokane,USA, R1-1705402, Apr. 3-7, 2017, 2 pages.

HuaWei, HiSilicon, "Redundancy Schemes below PDCP Layer", 3GPP TSG-RAN2 Meeting #97, Athens,Greece, R2-1701201, Feb. 13-17, 2017, 4 pages.

Huawei, HiSilicon, "LCP with Multiple Numerologies", 3GPP TSG RAN WG2#97bis,Spokane,Washington,USA, R2-1702602, Apr. 3-7, 2017, 4 pages.

ISA State Intellectual Property Office of the People's Republic of China, Written Opinion of the International Searching Authority Issued in Application No. PCT/CN2017/082389, dated Oct. 9, 2017, WIPO, 9 pages.

State Intellectual Property Office of the People's Republic of China, Office Action and Search Report Issued in Application No. 2017800002776, dated May 29, 2020, 23 pages, (Submitted with Machine Translation).

Ericsson, "MAC impacts of different numerologies and flexible TTI duration", 3GPP TSG-RAN WG2 #95bis, Kaohsiung, Taiwan, Tdoc R2-166817, Oct. 10-14, 2016, 3 pages.

Office Action issued in the European Patent Application 17907685.6 dated Dec. 7, 2020, (10p).

Second Chinese Office Action and Search Report issued in Chinese Application No. 201780000277.6 dated Feb. 19, 2021 with English translation, (11p).

\* cited by examiner

METHOD AND APPARATUS FOR CONFIGURING CHANNEL CARRIER, USER EQUIPMENT AND BASE STATION

CROSS-REFERENCE TO RELATED APPLICATION

The present application is a continuation application and claims priority to the International Application No. PCT/CN2017/082389 filed on Apr. 28, 2017, which is incorporated herein by reference in its entirety.

TECHNICAL FIELD

The present disclosure relates to the field of communication technologies, and in particular, to a method, an apparatus, for configuring a channel carrier, user equipment, and a base station.

BACKGROUND

In a research discussion of the 5th Generation (5G) mobile communication technology project, in order to support diversified service requirements, such as large bandwidth services, low-latency and high-reliability services, and small data packet services, a concept of multiple numerologies/transmission time interval (numerologies/TTI) durations is introduced in a physical layer. The multiple numerologies refer to a plurality of supported sub-carrier intervals. The multiple TTI durations refer to a plurality of time lengths of supported TTIs.

In the related art, a logical channel may be mapped to one or more numerologies/TTI durations in a Radio Resource Control (RRC) message. In the configuration manner of the related art, user equipment (UE) in a multi-carrier communication, when allocating uplink resources of a particular carrier to a logical channel, may obtain a numerology/TTI duration configuration with a low priority for the logical channel, thereby reducing efficiency of service transmission. Additionally, in the related art, a configuration manner of mapping the logical channel to one or more numerologies/TTI durations by using the RRC message has low flexibility and long latency. Further, since UE in an inactive state does not perform cell handover during movement, the UE in the inactive state cannot determine the numerology/TTI duration configuration in time when moving to and residing in another cell which is adopting a different carrier.

SUMMARY

The present disclosure provides a method and an apparatus for configuring a channel carrier, user equipment, and a base station. The logical channel and the numerology/TTI are configured in a distinguishing carrier manner and the configuration of the numerology/TTI is updated by a Media Access Control (MAC) control element, thereby improving configuration flexibility and reducing latency.

According to a first aspect of an example of the present disclosure, a method of configuring a channel carrier is provided, including receiving a message carrying channel carrier configuration information sent by a base station, where the channel carrier configuration information indicates numerology/TTI configuration information for a logical channel; and determining each carrier mapped to the logical channel and a numerology/TTI configured for each carrier mapped to the logical channel, based on the channel carrier configuration information.

According to a second aspect of an example of the present disclosure, a method of configuring a channel carrier is provided, including generating a message carrying channel carrier configuration information, where the channel carrier configuration information indicates numerology/TTI configuration information for a logical channel; and sending the message to user equipment, where the message is configured for the user equipment to determine each carrier mapped to the logical channel and a numerology/TTI configured for each carrier mapped to the logical channel.

According to a third aspect of an example of the present disclosure, an apparatus for configuring a channel carrier is provided, including a first receiving module configured to receive a message carrying channel carrier configuration information sent by a base station, where the channel carrier configuration information indicates numerology/TTI configuration information for a logical channel; and a first configuring module configured to determine each carrier mapped to the logical channel and a numerology/TTI configured for each carrier mapped to the logical channel, based on the channel carrier configuration information carried in the message received by the first receiving module.

According to a fourth aspect of an example of the present disclosure, an apparatus for configuring a channel carrier is provided, including a first generating module configured to generate a message carrying channel carrier configuration information, where the channel carrier configuration information indicates numerology/TTI configuration information for a logical channel; and a first sending module configured to send the message generated by the first generating module to user equipment, where the message is configured for the user equipment to determine each carrier mapped to the logical channel and a numerology/TTI configured for each carrier mapped to the logical channel.

According to a fifth aspect of an example of the present disclosure, user equipment is provided, including: a processor, and a memory storing instructions executable by the processor; where the processor is configured to receive a message carrying channel carrier configuration information sent by a base station, where the channel carrier configuration information indicates numerology/TTI configuration information for a logical channel; and determine each carrier mapped to the logical channel and a numerology/TTI configured for each carrier mapped to the logical channel, based on the channel carrier configuration information.

According to a sixth aspect of an example of the present disclosure, a base station is provided, including: a processor, and a memory storing instructions executable by the processor; where the processor is configured to generate a message carrying channel carrier configuration information, where the channel carrier configuration information indicates numerology/TTI configuration information for a logical channel; and send the message to user equipment, where the message is configured for the user equipment to determine each carrier mapped to the logical channel and a numerology/TTI configured for each carrier mapped to the logical channel.

According to a seventh aspect of an example of the present disclosure, a non-transitory computer-readable storage medium is provided for storing instructions. When executed by a processor, the instructions cause the processor to receive a message carrying channel carrier configuration information sent by a base station, where the channel carrier configuration information indicates numerology/TTI configuration information for a logical channel; and determine each carrier mapped to the logical channel and a numerology/TTI configured for each carrier mapped to the logical channel, based on the channel carrier configuration information.

According to an eighth aspect of an example of the present disclosure, a non-transitory computer-readable storage medium is provided for storing instructions, when executed by a processor, the instructions cause the processor to generate a message carrying channel carrier configuration information, where the channel carrier configuration information indicates numerology/TTI configuration information for a logical channel; and send the message to user equipment, where the message is configured for the user equipment to determine each carrier mapped to the logical channel and a numerology/TTI configured for each carrier mapped to the logical channel.

When the UE receives the message carrying the channel carrier configuration information sent by the base station, each logical channel may be mapped to a corresponding carrier, and a corresponding numerology/TTI may be configured for the carrier mapped to the logical channel, thereby configuring the logical channel and the numerology/TTI in a distinguishing carrier manner. Further, by carrying the channel carrier configuration information in the MAC control element, some or all of the low flexibility and long latency caused by a configuring manner of mapping the logical channel to one or more numerologies/TTIs only using an RRC message are avoided.

It is understood that the above general descriptions and the subsequent detailed descriptions are merely illustrative and explanatory and not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

FIG. 1 B is a scenario diagram illustrating a method of configuring a channel carrier, according to an example.

DETAILED DESCRIPTION

Figure 1A:
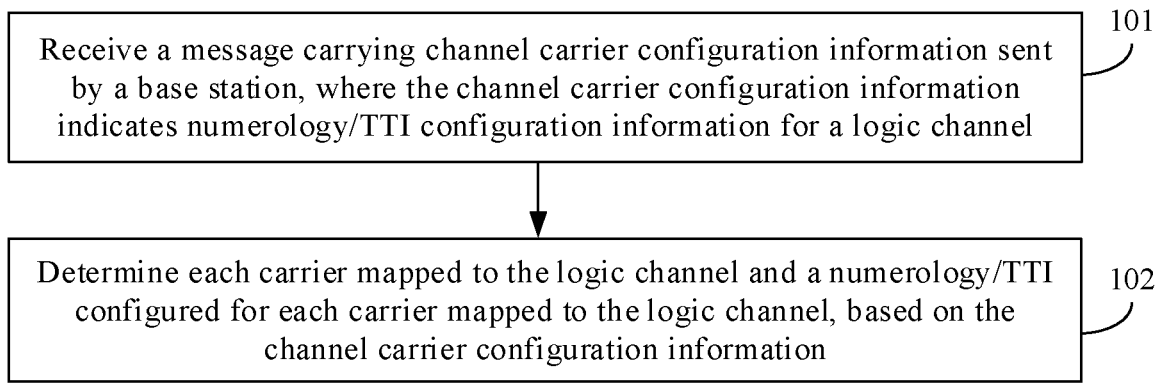
FIG. 1 A is a flow chart illustrating a method of configuring a channel carrier, according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment" depending on the context.

FIG. 1 A is a flow chart illustrating a method of configuring a channel carrier, according to an example. For example, a channel carrier may refer to one or more carriers configured for a logical channel. The method of configuring a channel carrier may be applied to UE. As shown in FIG. 1A, the method of configuring a channel carrier may include the following blocks 101 and 102.

Figure 1B:
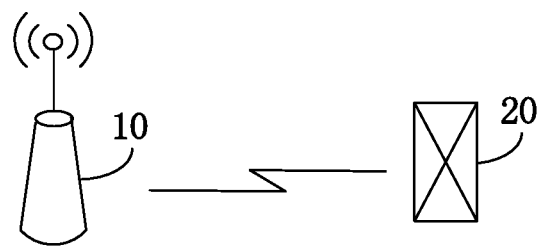

FIG. 1B is a scenario diagram illustrating a method of configuring a channel carrier, according to an example.

At block 101, a message carrying channel carrier configuration information sent by a base station is received, where the channel carrier configuration information indicates numerology/TTI configuration information for a logical channel. Here, the symbol "I" indicates "and/or" that is intended to signify and include any or all possible combinations of one or more of the associated listed items.

In an example, the numerology may be understood as a set of parameters used by a communication system. For example, the numerology may include a sub-carrier spacing (SCS), a symbol length, a cyclic prefix (CP) length, and so on. For different numerologies, the parameter values may also be different. For example, the SCS is set to $15*(2^n)$ kHz, where n may be a negative number. That is, the SCS may be set to 3.75 kHz, 7.5 kHz, 15 kHz, 30 kHz, 60 kHz, 120 kHz and so on. The other parameters may also be set to a variable value.

In an example, there may be a plurality of TTI (TTI) durations, for example, a TTI duration may be two symbols, four symbols, eight symbols, one sub-frame, a plurality of sub-frames or the like.

In an example, the channel carrier configuration information may be numerology/TTI configuration information for a logical channel. Because there is a situation with multiple carriers, the logical channel and the carriers may be firstly bound and then a corresponding numerology/TTI is configured for the bound carrier. For example, logical channel 1 is bound with carrier 1 and carrier 2, the carrier 1 is configured with numerology 1/TTI 1, and the carrier 2 is configured with numerology 2/TTI 2. Thus, the numerology/TTI is configured for the logical channel in a distinguishing carrier manner.

In an example, the message may be an RRC message, such as a connection reconfiguration message, a cell handover message, or the like. The channel carrier configuration information may be added in an encapsulation header of an RRC layer in the RRC message, so as to perform channel carrier configuration for the UE accessing an RRC connection.

Figure 2:
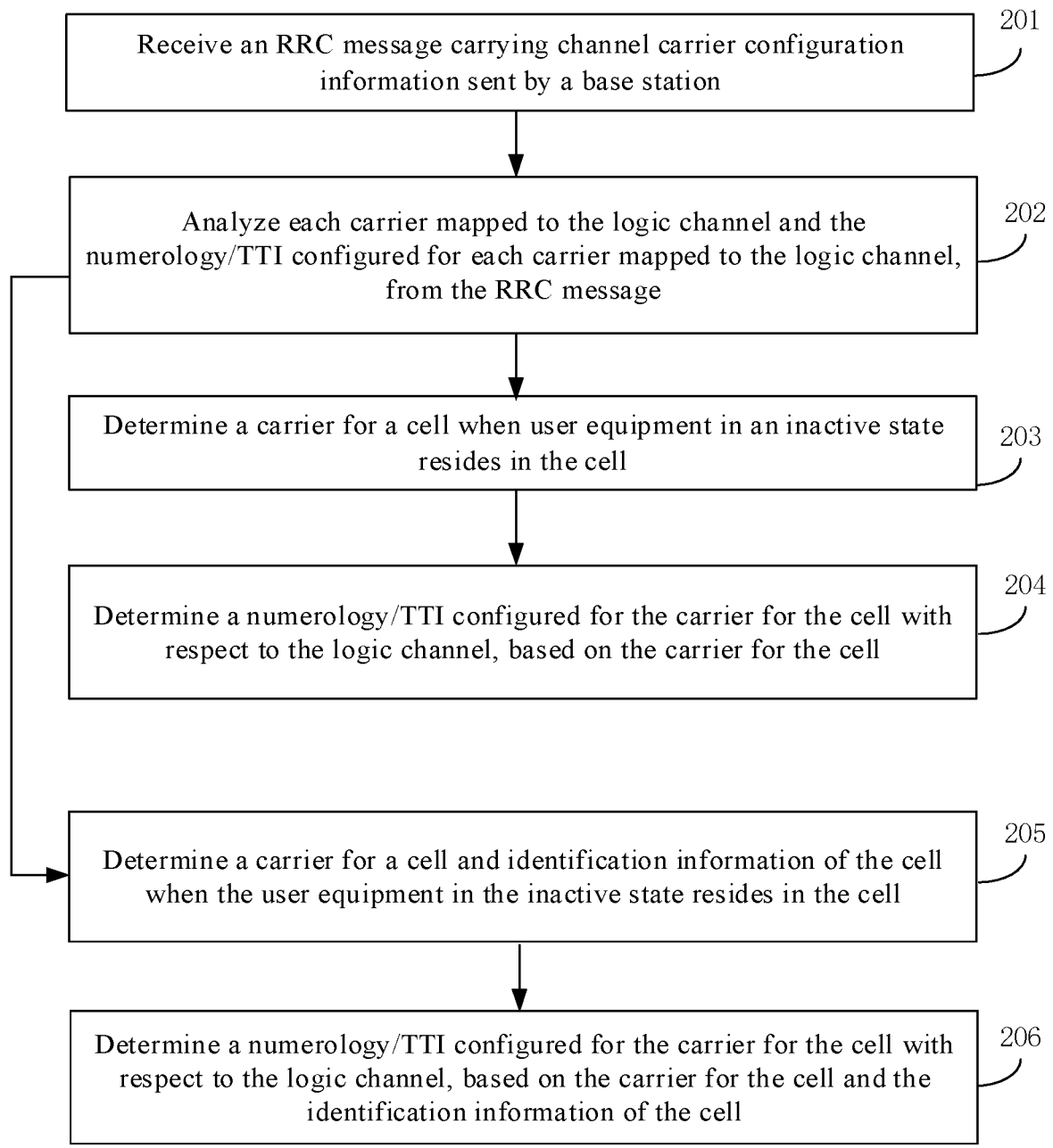
FIG. 2 is a flow chart illustrating a method of configuring a channel carrier, according to an example.

In an example, a channel carrier configuration flow with the message being the RRC message may be refer to the example shown in FIG. 2.

In an example, the message may be a general message with an unlimited type, such as a system message, a service data message, or the like. The message may also be an RRC message. The channel carrier configuration information may be added to a Media Access Control (MAC) control element in a MAC layer Protocol Data Unit (PDU), so as to update a channel carrier configuration stored in the UE. A modification latency may be reduced by carrying the channel carrier configuration information in the MAC control element. In an example, when the message carries the channel carrier configuration information through the MAC control element, the channel carrier configuration information may only include a carrier or a carrier list corresponding to the logical channel; or only include a numerology/TTI configured for one or more carriers associated with the logical channel.

Figure 3A:
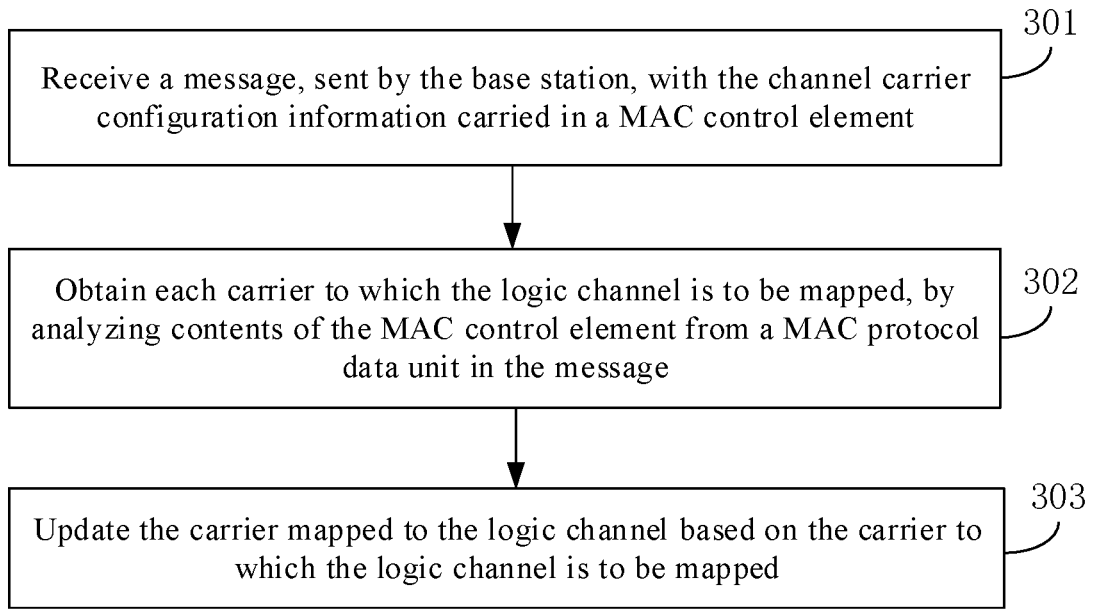
FIG. 3A is a flow chart illustrating a method of configuring a channel carrier, according to an example.
Figure 3B:
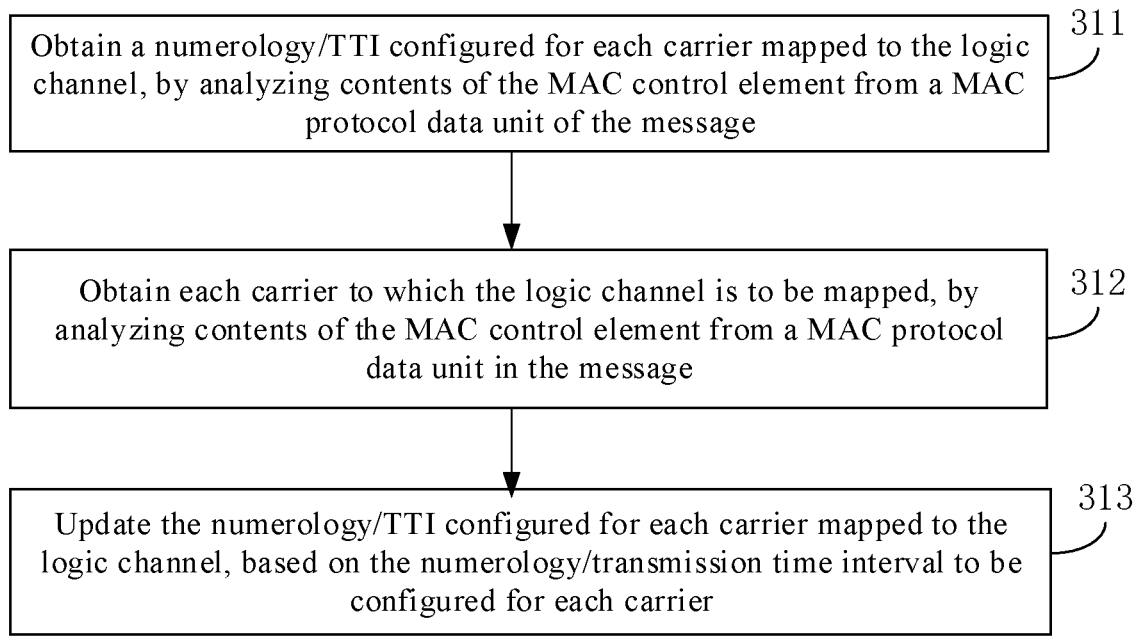
FIG. 3B is a flow chart illustrating a method of configuring a channel carrier, according to an example.

In an example, a channel carrier configuration flow may be referred to the examples shown in FIG. 3A and FIG. 3B, which the message is a general message and the channel carrier configuration information is carried through the MAC control element.

At block 102, based on the channel carrier configuration information, each carrier mapped to the logical channel and a numerology/TTI configured for each carrier mapped to the logical channel are determined.

In an example, a reference may be made to the example shown in FIG. 2 for a flow of determining each carrier mapped to the logical channel and the numerology/TTI configured for each carrier mapped to the logical channel based on the channel carrier configuration information in the RRC message.

In an example, a reference may be made to the examples shown in FIGS. 3A and 3B for a flow of determining each carrier mapped to the logical channel and the numerology/TTI configured for each carrier mapped to the logical channel based on the channel carrier configuration information in the MAC control element of the general message.

In an example, as shown in FIG. 1B, illustrative descriptions are made with a mobile network as a 5G network and a base station as gNB (a 5G base station). The scenario shown in FIG. 1B includes gNB 10 and UE 20. gNB 10 may indicate channel carrier configuration information to UE through a message. After receiving the message carrying the channel carrier configuration information, UE 20 may configure a logical channel and a numerology/TTI per carrier, that is, in a distinguishing carrier manner. Further, when the channel carrier configuration of UE 20 is to be updated, gNB 10 may directly send new channel carrier configuration information through a MAC control element in a message of any type. In this way, some or all of the low flexibility and long latency caused by a configuring manner of mapping the logical channel to one or more numerologies/TTIs only using an RRC message are avoided.

Through the above blocks 101-102, each logical channel may be mapped to corresponding carrier(s), and a corresponding numerology/TTI is configured for a carrier mapped to the logical channel. Thus, the logical channel and the numerology/TTI are configured in a distinguishing carrier manner. Further, by carrying the channel carrier configuration information in the MAC control element, problems of low flexibility and long latency caused by a configuring manner of mapping the logical channel to one or more numerologies/TTIs only using the RRC message are avoided.

In an example, receiving the message carrying the channel carrier configuration information sent by the base station includes receiving an RRC message carrying the channel carrier configuration information sent by the base station.

In an example, determining each carrier mapped to the logical channel and the numerology/TTI configured for each carrier mapped to the logical channel based on the channel carrier configuration information includes analyzing each carrier mapped to the logical channel and the numerology/TTI configured for each carrier mapped to the logical channel from the RRC message.

In an example, when the RRC message is an RRC message instructing the UE to switch to an inactive state, the RRC message further carries respective numerologies/TTIs configured for different carriers associated with the logical channel.

The method of configuring a channel carrier further includes: determining a carrier for a cell when the UE in the inactive state resides in the cell; and determining the numerology/TTI configured for the carrier of the cell with respect to the logical channel based on the carrier of the cell.

In an example, when the RRC message is an RRC message instructing the UE to switch to an inactive state, the RRC message further carries respective numerologies/TTIs configured for different carriers and different cells associated with the logical channel.

The method of configuring a channel carrier further includes: determining a carrier for a cell and identification information of the cell when the UE in the inactive state resides in the cell; and determining a numerology/TTI configured for the carrier for the cell with respect to the logical channel, based on the carrier for the cell and the identification information of the cell.

In an example, receiving the message carrying the channel carrier configuration information sent by the base station includes receiving the message with the channel carrier configuration information carried in a MAC control element sent by the base station.

In an example, determining each carrier mapped to the logical channel and the numerology/TTI configured for each carrier mapped to the logical channel based on the channel carrier configuration information includes obtaining each carrier to which the logical channel is to be mapped by analyzing contents of the MAC control element from a MAC protocol data unit in the message; and updating the carrier mapped to the logical channel based on the carrier to which the logical channel is to be mapped.

In an example, determining each carrier mapped to the logical channel and the numerology/TTI configured for each carrier mapped to the logical channel based on the channel carrier configuration information includes obtaining a numerology/TTI to be configured for each carrier mapped to the logical channel by analyzing contents of the MAC control element from a MAC protocol data unit of the message; and updating the numerology/TTI configured for each carrier mapped to the logical channel based on the numerology/TTI to be configured for the carrier.

In an example, the method of configuring a channel carrier further includes: receiving an uplink (UL) grant message sent by the base station; analyzing the UL grant message to obtain an allocated carrier and a numerology/TTI configured for the allocated carrier; and determining uplink resource allocation information based on the allocated carrier, the numerology/TTI configured for the allocated carrier, a locally-stored carrier mapped to the logical channel, and a locally-stored numerology/TTI configured for each carrier mapped to the logical channel.

A reference may be made to the subsequent examples for how to configure a channel carrier.

Thus, the methods provided by examples of the present disclosure may configure the logical channel and the numerology/TTI in a distinguishing carrier manner. When updating the channel carrier configuration of the UE, the channel carrier configuration information carried in the MAC control element may be used. Thus, flexibility of updating configuration is improved and latency is reduced.

FIG. 2 is a flow chart illustrating another method of configuring a channel carrier according to an example. According to the above method of the examples of the present disclosure, illustrative descriptions are made to a flow of configuring a channel carrier with a message as an RRC message. As shown in FIG. 2, the following blocks are included.

At block 201, an RRC message carrying channel carrier configuration information sent by a base station is received.

In an example, the RRC message may be a connection reconfiguration message, a cell handover instruction, a state switching message and so on. The base station may add the channel carrier configuration information in an RRC layer. The channel carrier configuration information in the RRC message may include each carrier bound with a logical channel and a numerology/TTI configured for each carrier bound with the logical channel.

At block 202, each carrier mapped to the logical channel and a numerology/TTI configured for each carrier mapped to the logical channel are analyzed from the RRC message.

In an example, each carrier mapped to the logical channel and the numerology/TTI configured for each carrier mapped to the logical channel may be analyzed in an encapsulation header of an RRC layer in the RRC message.

In an example, when the RRC message is an RRC message instructing the UE to switch to an inactive state, the method further includes blocks 203 and 204.

At block 203, a carrier for a cell is determined when the UE in an inactive state resides in the cell.

At block 204, a numerology/TTI configured for the carrier for the cell with respect to the logical channel is determined based on the carrier for the cell.

In an example, at blocks 203 and 204, when the RRC message is an RRC message instructing the UE to switch to the inactive state, the UE switches to the inactive state, and by analyzing the RRC message, the UE obtains a carrier that can be bound to each logical channel, and obtains a numerology/TTI configured for the carrier which can be bound. Thus, when the UE in the inactive state resides in a cell, the numerology/TTI configured for the logical channel may be determined based on the carrier of the cell.

In an example, when the RRC message is an RRC message instructing the UE to switch to an inactive state, the method further includes blocks 205 and 206.

At block 205, when the UE in the inactive state resides in a cell, a carrier for the cell and identification information of the cell are determined.

At block 206, the numerology/TTI configured for the carrier of the cell with respect to the logical channel is determined based on the carrier for the cell and the identification information of the cell.

In an example, at blocks 205 and 206, when the RRC message is an RRC message instructing the UE to switch to the inactive state, the UE is switched to the inactive state, and by analyzing the RRC message, the UE obtains carriers that can be bound to each logical channel in different cells, and obtains a numerology/TTI configured for the carrier which can be bound. Thus, when the UE in the inactive state resides in a cell, the numerology/TTI configured for the logical channel may be determined based on the carrier for the cell and the identification information of the cell.

In the example, for the UE instructed to switch to the inactive state, the corresponding RRC message for instructing the switch may carry channel carrier configuration information associated with another cell, where the another cell is a cell the UE will reside. In this way, after the UE switches to the inactive state and resides in the another cell, it is ensured that the UE in the inactive state can still determine the configuration of the numerology/TTI.

FIG. 3A is flow chart 1 illustrating still another method of configuring a channel carrier according to an example. FIG. 3B is flow chart 2 illustrating still another method of configuring a channel carrier according to an example. According to the above methods of the examples of the present disclosure, illustrative descriptions are made to a flow of configuring a channel carrier, in which the message is a message with channel carrier configuration information carried in a MAC control element. As shown in FIG. 3A, the method may include the following blocks.

At block 301, a message with channel carrier configuration information carried in a MAC control element sent by a base station is received.

In an example, the message with the channel carrier configuration information carried in the MAC control element may be a service data message, a system message, or the like. The type of the message with the channel carrier configuration information carried in the MAC control element is not limited in the present disclosure.

At block 302, each to-be-mapped carrier for a logical channel is obtained by analyzing contents in the MAC control element of a MAC protocol data unit of the message.

In an example, the MAC control element may only carry each to-be-mapped carrier for the logical channel, and the to-be-mapped carrier may be more than one carrier. For example, if a channel carrier configuration is logical channel 1 being mapped to carrier 1, carrier 2 and carrier 3, where the channel carrier configuration is configured for a data radio bearer (DRB) in an RRC configuration, in the subsequent MAC control element, the carrier mapped to logical channel 1 may be updated to any one of carrier 1, carrier 2 and carrier 3, or a combination of any two.

In an example, if original mapped carrier(s) associated with a logical channel do not include the carrier mapped to the logical channel in the MAC control element, the MAC control element is required to further carry a numerology/TTI of a newly-added carrier. For example, assuming that a channel carrier configuration is logical channel 1 being mapped to carrier 1 and carrier 2, where the channel carrier configuration is configured for a DRB in an RRC configuration. In this case, when the carrier mapped to logical channel 1 is to be updated to carrier 3 in the MAC control element, it is to analyze the numerology/TTI configured for carrier 3 in the MAC control element, where carrier 3 is mapped to logical channel 1.

At block 303, carrier mapped to the logical channel is updated based on the to-be-mapped carrier.

In an example, if the MAC control element carries the numerology/TTI configured for each carrier mapped to the logical channel, the following blocks may be included based on the channel carrier configuration method shown in FIG. 3B.

At block 311, a numerology/TTI to be configured for each carrier mapped to the logical channel is obtained by analyzing contents in the MAC control element within the MAC protocol data unit of the message.

At block 312, each carrier to which the logical channel is to be mapped, is obtained by analyzing the contents in the MAC control element within the MAC protocol data unit of the message.

At block 313, a numerology/TTI configured for each carrier mapped to the logical channel is updated based on a numerology/TTI to be configured for the carrier.

In an example, the MAC control element may carry a new numerology/TTI configured for each carrier mapped to the logical channel. For example, if a channel carrier configuration is logical channel 1 being mapped to carrier 1 and carrier 2, where the channel carrier configuration is configured for a DRB in an RRC configuration, numerologies/TTIs configured for carrier 1 is numerology 1/TTI 1 and numerology 2/TTI 2. In this case, when a numerology/TTI for carrier 1 bound with logical channel 1 is set to numerology 1/TTI 1 in the MAC control element, the numerology/TTI for carrier 1 bound with logical channel 1 may be updated to numerology 1/TTI 1.

In an example, when receiving the message with the channel carrier configuration information carried in the MAC control element, the UE may update the channel carrier configuration in time. Some low flexibility and long latency caused by a configuring manner of mapping the logical channel to one or more numerologies/TTIs only using the RRC message are avoided.

Figure 4:
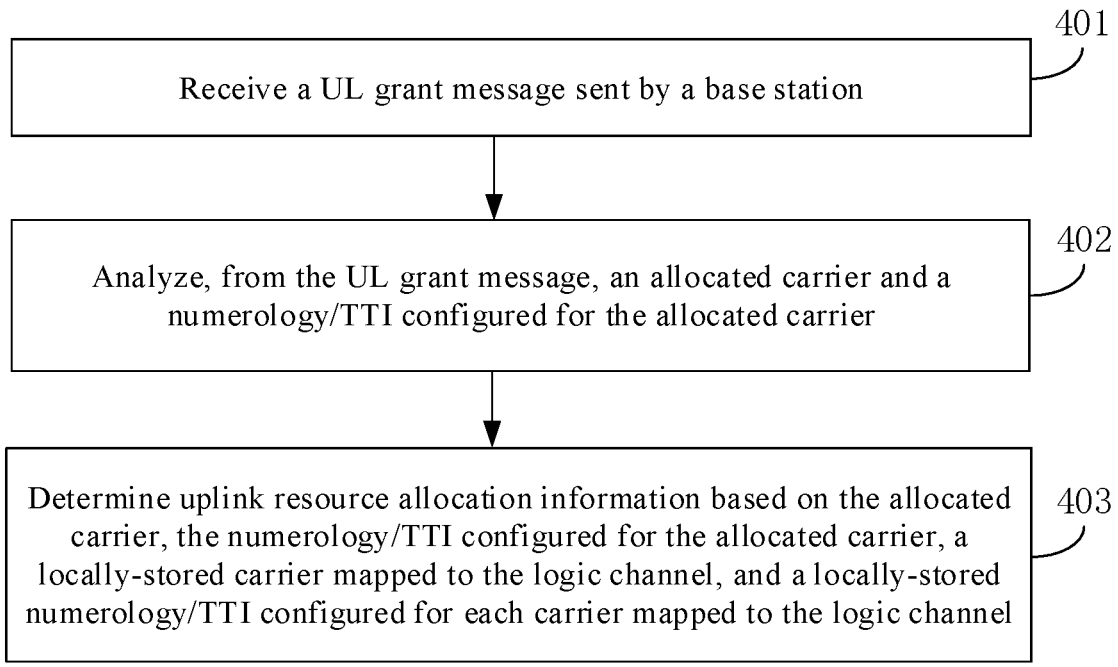
FIG. 4 is a flow chart illustrating a method of configuring a channel carrier, according to an example.

FIG. 4 is a flow chart illustrating yet another method of configuring a channel carrier according to an example. According to the above methods of examples of the present disclosure, illustrative descriptions are made to a flow of allocating, by UE, an uplink resource to a logical channel upon receiving a UL grant message. As shown in FIG. 4, the following blocks are included.

At block 401, an uplink (UL) grant message sent by a base station is received.

In an example, when receiving a scheduling message for allocating radio resources from the base station, e.g., the UL grant message, UE can determine in which time domain and on which carrier data is transmitted, and an adopted modulation and coding scheme.

At block 402, an allocated carrier and a numerology/TTI configured for the allocated carrier are obtained by analyzing the UL grant message.

At block 403, uplink resource allocation information is determined based on the allocated carrier, the numerology/TTI configured for the allocated carrier, a locally-stored carrier mapped to the logical channel, and a locally-stored numerology/TTI configured for each carrier mapped to the logical channel.

In an example, at blocks 401-403, the UL grant message further carries the numerology/TTI configured for the carrier. For example, the UE may be granted to transmit data on carrier 1 based on numerology 1/TTI 1. In this case, the UE may firstly determine that a logical channel is bound with carrier 1. If logical channel 1 is bound with carrier 1, it is further determined if the UL grant message indicating the uplink resource allocation information, where the uplink resource includes the numerology/TTI configured for carrier 1 bound with logical channel 1. If the uplink resource exists and is not allocated out yet, the uplink resource may be allocated for the logical channel 1.

In an example, if the UE receives a message carrying the channel carrier configuration information during a process of using the uplink resource, the allocation of the uplink resource is performed still based on an original channel carrier configuration for a UL grant received before the message carrying the channel carrier configuration information is received; and the allocation of the uplink resource is performed based on an updated channel carrier configuration for a UL grant received after the message carrying the channel carrier configuration information is received.

In the example, after receiving the UL grant message, the UE may perform allocation for the uplink resource based on the carrier and the numerology/TTI configured for the carrier, thereby realizing an optimal result of resource allocation.

Figure 5:
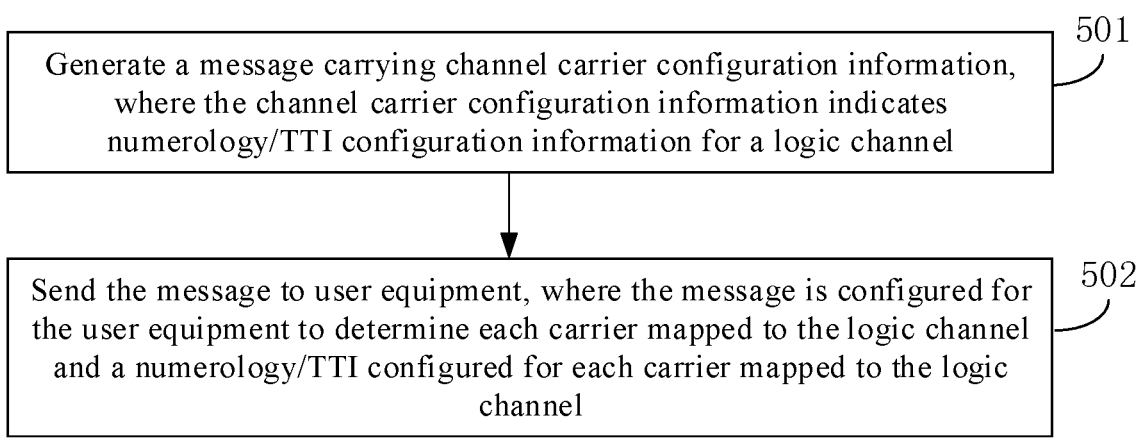
FIG. 5 is a flow chart illustrating a method of configuring a channel carrier, according to an example.

FIG. 5 is a flow chart illustrating a method of configuring a channel carrier according to an example, which may be applied to a base station. This example will be described illustratively in combination with FIG. 1B. As shown in FIG. 1B, the method of configuring a channel carrier may include the following blocks 501-502.

At block 501, a message carrying channel carrier configuration information is generated, where the channel carrier configuration information indicates numerology/TTI configuration information for a logical channel.

In an example, for an RRC message, the channel carrier configuration information includes information on each carrier mapped to the logical channel and information on a numerology/TTI configured for each carrier mapped to the logical channel. In an example, for a message instructing UE to switch to an inactive state, the channel carrier configuration information further includes respective numerologies/TTIs configured for different carriers associated with the logical channel, or respective numerologies/TTIs configured for different carriers and different cells associated with the logical channel. In an example, for the RRC message, the channel carrier configuration information may be added in an encapsulation header of an RRC layer.

In an example, when the message is not the RRC message, the channel carrier configuration information may include each to-be-mapped carrier for the logical channel, and/or, a numerology/TTI configured for each carrier mapped to the logical channel. In an example, when the message is not the RRC message, the channel carrier configuration information may be added in a MAC control element.

At block 502, the message is sent to the UE, where the message is used for the UE to determine each carrier mapped to the logical channel and a numerology/TTI configured for each carrier mapped to the logical channel.

In an example, as shown in FIG. 1B, illustrative descriptions are made with a mobile network as a 5G network and a base station as gNB (a 5G base station). The scenario shown in FIG. 1B includes gNB 10 and UE 20. gNB 10 may indicate channel carrier configuration information to UE through a message. After receiving the message carrying the channel carrier configuration information, UE 20 may configure a logical channel and a numerology/TTI per carrier, that is, in a distinguishing carrier manner. Further, when the channel carrier configuration of UE 20 is to be updated, gNB 10 may directly send new channel carrier configuration information through a MAC control element in a message of any type. In this way, some or all of the low flexibility and long latency caused by a configuring manner of mapping the logical channel to one or more numerologies/TTIs only using the RRC message are avoided.

In an example, through the above blocks 501-502, each logical channel may be mapped to corresponding carrier(s), and a corresponding numerology/TTI is configured for each carrier mapped to the logical channel. Thus, the logical channel and the numerology/TTI are configured in a distinguishing carrier manner. Further, by carrying the channel carrier configuration information in the MAC control element, some or all of the low flexibility and long latency caused by a configuring manner of mapping the logical channel to one or more numerologies/TTIs only using the RRC message are avoided.

In the example, when the message is an RRC message, the channel carrier configuration information includes information on each carrier mapped to the logical channel and information on the numerology/TTI configured for each carrier mapped to the logical channel.

In an example, when the RRC message is a message instructing the UE to switch to an inactive state, the RRC message further carries the respective numerologies/TTIs configured for different carriers associated with the logical channel; or respective numerologies/TTIs configured for different carriers and different cells associated with the logical channel.

In an example, when the message is not an RRC message, generating the message carrying the channel carrier configuration information includes: obtaining the message by adding the channel carrier configuration information to a MAC control element of the message.

In an example, the channel carrier configuration information includes information on each carrier to which the logical channel is to be mapped and/or information on the numerology/TTI configured for each carrier mapped to the logical channel.

In an example, the method of configuring a channel carrier further includes generating a UL grant message, where the UL message carries a carrier allocated to the UE and a numerology/TTI configured for the carrier; and sending the UL grant message to the UE.

The present disclosure will be described below with specific examples.

Figure 6:
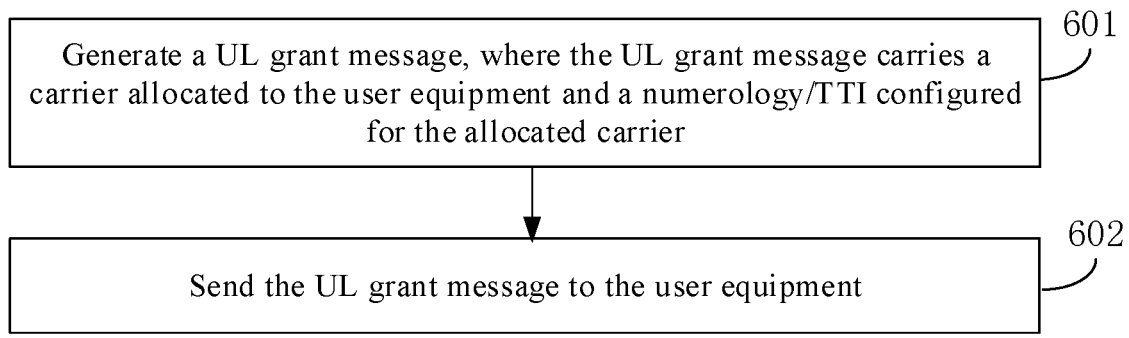
FIG. 6 is a flow chart illustrating a method of configuring a channel carrier, according to an example.

FIG. 6 is a flow chart illustrating another method of configuring a channel carrier according to an example. According to the above methods of the examples of the present disclosure, illustrative descriptions are made with how to instruct allocating an uplink resource to UE. As shown in FIG. 6, the following blocks are included.

At block 601, an uplink grant scheduling message is generated, where the uplink grant scheduling message carries a carrier allocated to the UE and a numerology/TTI configured for the carrier.

In an example, gNB should firstly know quality of an uplink channel before allocating the uplink resource to the UE. Upon the uplink channel of the UE has good quality and the UE has a requirement of data transmission, the gNB may allocate a resource to the UE.

In an example, when the base station allocates the resource to the UE based on the uplink channel quality of the UE, the carrier allocated to the UE and the numerology/TTI configured for the carrier may be added in a UL grant message, so as to generate the UL grant message. For example, UE may be granted to transmit data on carrier 1 based on numerology 1/TTI 1.

At block 602, the uplink grant scheduling message is sent to the UE.

In an example, the base station may add the carrier allocated to the UE and the numerology/TTI configured for the carrier in the UL grant message, and send the UL grant message to the UE, so that the UE may allocate the uplink resource based on the carrier and the configured numerology/TTI, thereby realizing an optimal result of resource allocation.

Figure 7:
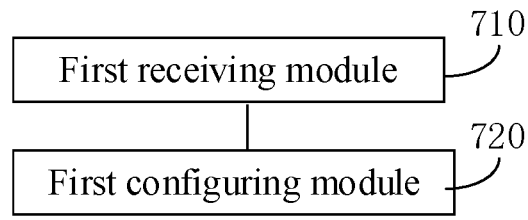
FIG. 7 is a block diagram illustrating an apparatus for configuring a channel carrier according to an example.

FIG. 7 is a block diagram illustrating an apparatus for configuring a channel carrier according to an example. As shown in FIG. 7, the apparatus for configuring a channel carrier includes: a first receiving module 710, configured to receive a message carrying channel carrier configuration information sent by a base station, where the channel carrier configuration information indicates numerology/TTI configuration information for a logical channel; and a first configuring module 720, configured to determine each carrier mapped to the logical channel and a numerology/TTI configured for each carrier mapped to the logical channel, based on the channel carrier configuration information carried in the message received by the first receiving module 710.

Figure 8:
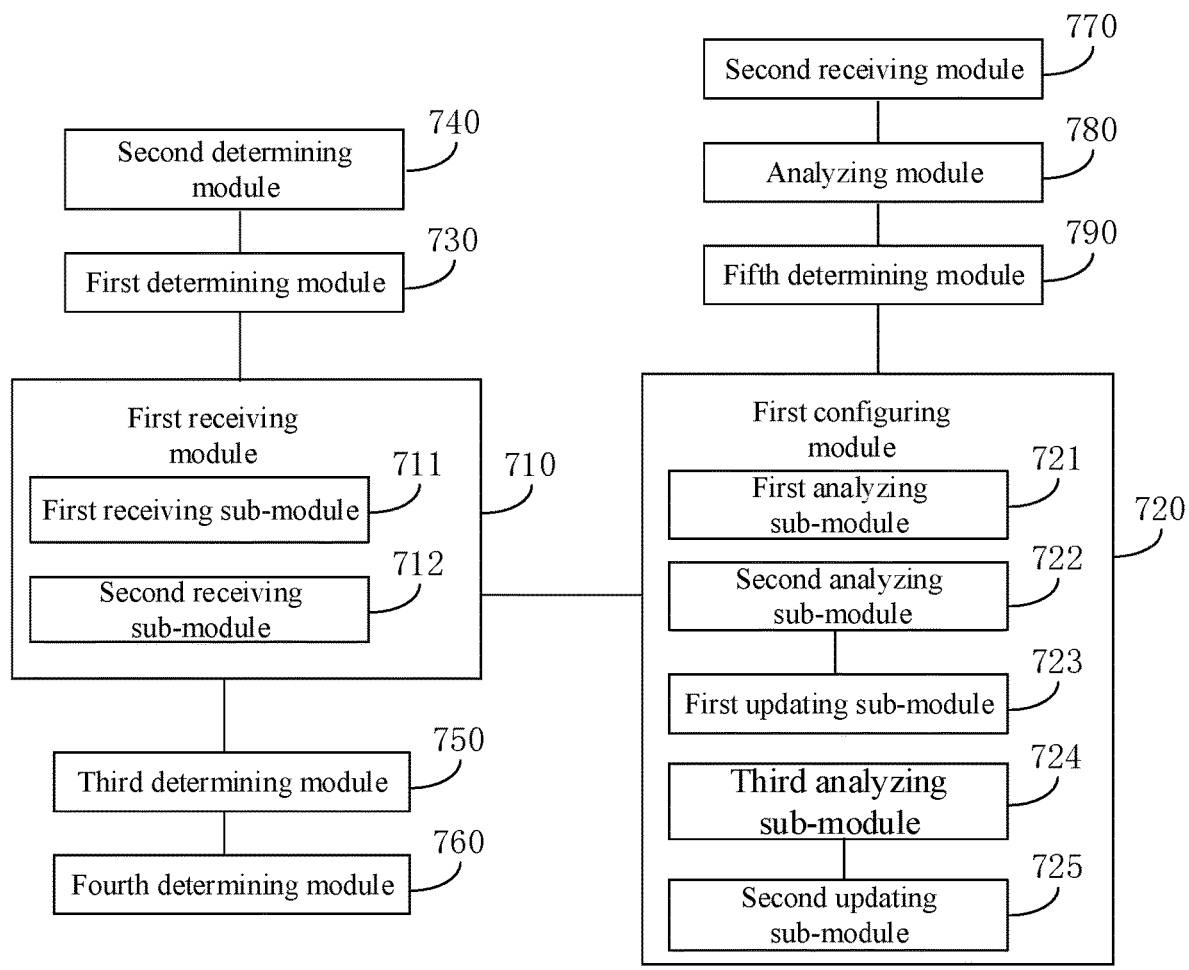
FIG. 8 is a block diagram illustrating an apparatus for configuring a channel carrier according to an example.

FIG. 8 is a block diagram illustrating another apparatus for configuring a channel carrier according to an example. In an example, as shown in FIG. 8, based on the example of FIG. 7, the first receiving module 710 may include: a first receiving sub-module 711, configured to receive an RRC message carrying the channel carrier configuration information sent by the base station.

In an example, the first configuring module 720 includes: a first analyzing sub-module 721, configured to analyze, from the RRC message, the carriers mapped to each logical channel and the numerology/TTI configured for each carrier mapped to the logical channel.

In an example, when the RRC message is an RRC message instructing user equipment to switch to an inactive state, the RRC message further carries respective numerologies/TTIs configured for different carriers associated with the logical channel; the apparatus further includes: a first determining module 730, configured to determine a carrier for a cell when the user equipment in the inactive state resides in the cell; and a second determining module 740, configured to determine a numerology/TTI configured for the carrier for the cell with respect to the logical channel, based on the carrier for the cell which is determined by the first determining module 730.

In an example, when the RRC message is the RRC message instructing the user equipment to switch to the inactive state, the RRC message further carries respective numerologies/TTIs configured for different carriers and different cells associated with the logical channel; and the apparatus further includes: a third determining module 750, configured to determine a carrier for a cell and identification information of the cell when the user equipment in the inactive state resides in the cell; and a fourth determining module 760, configured to determine a numerology/TTI configured for the carrier for the cell with respect to the logical channel, based on the carrier for the cell and the identification information of the cell which are determined by the third determining module 750.

In an example, the first receiving module 710 includes: a second receiving sub-module 712, configured to receive the message, sent by the base station, with the channel carrier configuration information carried in a MAC control element.

In an example, the first configuring module 720 includes: a second analyzing sub-module 722, configured to obtain each carrier to which the logical channel is to be mapped, by analyzing contents of the MAC control element from a MAC protocol data unit in the message; and a first updating sub-module 723, configured to update the carrier mapped to the logical channel based on the carrier to which the logical channel is to be mapped, obtained by the second analyzing sub-module.

In an example, the first configuring module 720 includes: a third analyzing sub-module 724, configured to obtain a numerology/TTI to be configured for each carrier mapped to the logical channel, by analyzing contents of the MAC control element from a MAC protocol data unit of the message; and a second updating sub-module 725, configured to update the numerology/TTI configured for each carrier mapped to the logical channel, based on the numerology/TTI to be configured for the carrier which is obtained by the third analyzing sub-module 724.

In an example, the apparatus further includes: a second receiving module 770, configured to receive a UL grant message sent by the base station; an analyzing module 780, configured to analyze, from the UL grant message received by the second receiving module 770, an allocated carrier and a numerology/TTI configured for the allocated carrier; and a fifth determining module 790, configured to determine uplink resource allocation information based on the allocated carrier obtained by the analyzing module 780, the numerology/TTI configured for the allocated carrier obtained by the analyzing module 780, a locally-stored carrier mapped to the logical channel, and a locally-stored numerology/TTI configured for each carrier mapped to the logical channel.

Figure 9:
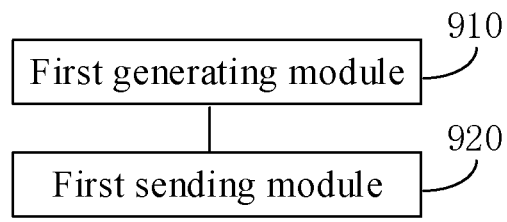
FIG. 9 is a block diagram illustrating an apparatus for configuring a channel carrier, according to an example.

FIG. 9 is a block diagram illustrating an apparatus for configuring a channel carrier according to an example of the present disclosure. As shown in FIG. 9, the apparatus for configuring a channel carrier includes: a first generating module 910, configured to generate a message carrying channel carrier configuration information, where the channel carrier configuration information indicates numerology/TTI configuration information for a logical channel; and a first sending module 920, configured to send the message generated by the first generating module 910 to user equipment, where the message is configured for the user equipment to determine each carrier mapped to the logical channel and a numerology/TTI configured for each carrier mapped to the logical channel.

Figure 10:
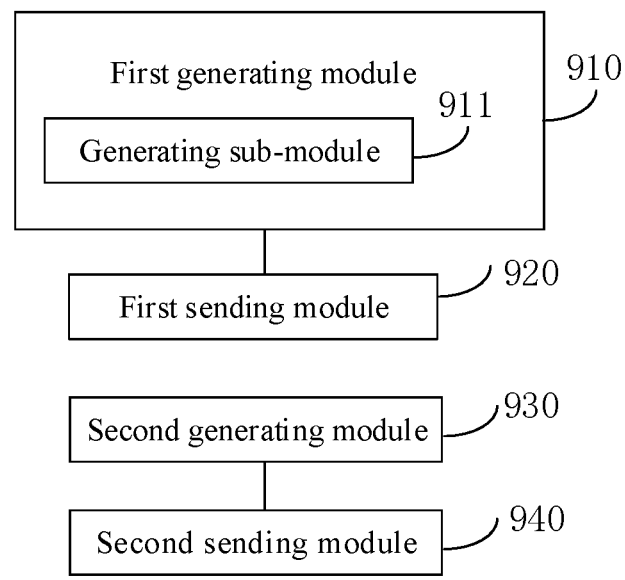
FIG. 10 is a block diagram illustrating an apparatus for configuring a channel carrier, according to an example.

FIG. 10 is a block diagram illustrating another apparatus for configuring a channel carrier according to an example of the present disclosure. In an example, as shown in FIG. 10, on the basis of the example of FIG. 9, when the message is an RRC message, the channel carrier configuration information includes information on each carrier mapped to the logical channel and information on the numerology/TTI configured for each carrier mapped to the logical channel.

In an example, when the RRC message is an RRC message instructing the user equipment to switch to an inactive state, the RRC message further carries respective numerologies/TTIs configured for different carriers associated with the logical channel, or respective numerologies/TTIs configured for different carriers and different cells associated with the logical channel.

In an example, when the message is not the RRC message, the first generating module 910 includes a generating sub-module 911, configured to obtain the message by adding the channel carrier configuration information to a MAC control element of the message.

In an example, the channel carrier configuration information includes information on each carrier to which the logical channel is to be mapped and/or information on the numerology/TTI configured for each carrier mapped to the logical channel.

In an example, the apparatus further includes a second generating module 930, configured to generate a UL grant message, where the UL grant message carries a carrier allocated to the user equipment and a numerology/TTI configured for the allocated carrier; and a second sending module 940, configured to send the UL grant message generated by the second generating module 930 to the user equipment.

The specific manners in which different modules of the apparatus of the above examples perform operation are already described in detail in the examples of relevant method, which will not be repeated here.

Figure 11:
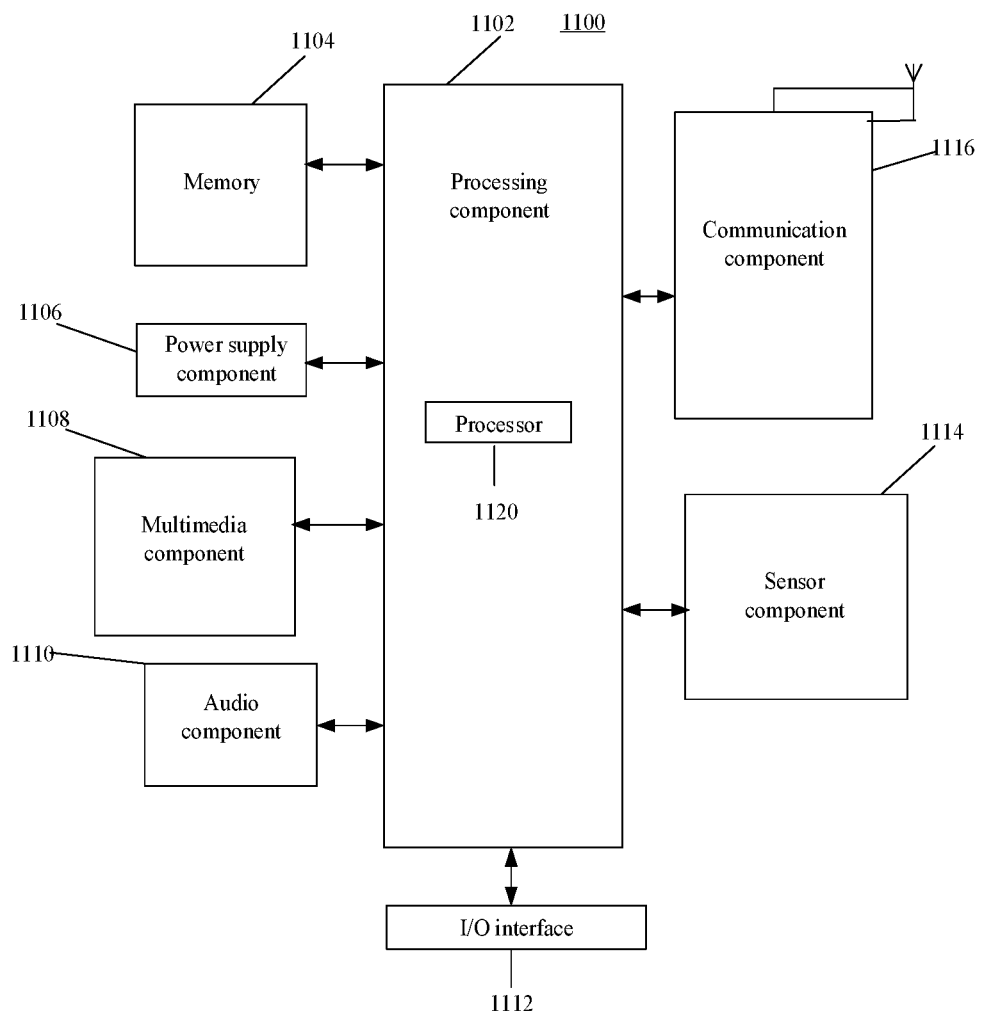
FIG. 11 is a block diagram illustrating an apparatus suitable for configuring a channel carrier, according to an example.

FIG. 11 is a block diagram illustrating an apparatus for configuring a channel carrier according to an example. For example, an apparatus 1100 may be user equipment, such as a mobile phone, a computer, a digital broadcast terminal, a message transceiver, a game console, a tablet device, a medical device, a fitness device, a personal digital assistant, and so on.

As shown in FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114 and a communication component 1116.

The processing component 1102 generally controls overall operations of the apparatus 1100, such as operations associated with display, phone calls, data communications, camera operations, and recording operations. The processing component 1102 may include one or more processors 1120 for executing instructions to complete all or a part of steps of the above method. In addition, the processing component 1102 may include one or more modules which facilitate the interaction between the processing component 1102 and other components. For example, the processing component 1102 may include a multimedia module to facilitate the interaction between the multimedia component 1108 and the processing component 1102.

The memory 1104 may be configured to store various types of data to support the operation of the apparatus 1100. The memory 1104 may also include a non-transitory computer-readable storage medium. Examples of such data include instructions for any application or method operated on the apparatus 1100, contact data, phonebook data, messages, pictures, videos, and so on. The memory 1104 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 1106 may provide power to different components of the apparatus 1100. The power supply component 1106 may include a power management system, one or more power supplies and other components associated with generating, managing, and distributing power for the apparatus 1100.

The multimedia component 1108 may include a screen providing an output interface between the apparatus 1100 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1108 may include a front camera and/or a rear camera. The front camera and/or rear camera may receive external multimedia data when the apparatus 1100 is in an operating mode, such as a photographing mode or a video mode. Each of the front camera and the rear camera may be a fixed optical lens system or have focal length and optical zooming capability.

The audio component 1110 may be configured to output and/or input an audio signal. For example, the audio component 1110 may include a microphone (MIC) configured to receive an external audio signal when the apparatus 1100 is in an operating mode, such as a call mode, a recording mode, and a voice recognition mode. The received audio signal may be further stored in the memory 1104 or sent via the communication component 1116. In some examples, the audio component 1110 further includes a speaker to output an audio signal.

The I/O interface 1112 provides interfaces between the processing component 1102 and peripheral interface modules. The above peripheral interface modules may be a keyboard, a click wheel, buttons, and so on. These buttons may include, but are not limited to, a home button, a volume button, a starting button, and a locking button.

The sensor component 1114 may include one or more sensors to provide status assessments of various aspects for the apparatus 1100. For example, the sensor component 1114 may detect an on/off state of the apparatus 1100, and relative positioning of an component, for example, the component is a display and a mini-keypad of the apparatus 1100. The sensor component 1114 may also detect a change in position of the apparatus 1100 or a component of the apparatus 1100, a presence or absence of the contact between a user and the apparatus 1100, an orientation or an acceleration/deceleration of the apparatus 1100, and a change in temperature of the apparatus 1100. The sensor component 1114 may include a proximity sensor configured to detect the presence of a nearby object without any physical contact. The sensor component 1114 may further include an optical sensor, such as a CMOS or CCD image sensor which is used in imaging applications. In some examples, the sensor component 1114 may further include an acceleration sensor, a gyroscope sensor, a magnetic sensor, a pressure sensor, or a temperature sensor.

The communication component 1116 may be configured to facilitate wired or wireless communication between the apparatus 1100 and other devices. The apparatus 1100 may access a wireless network that is based on a communication standard, such as Wi-Fi, 2G, 3G or a combination thereof. In an example, the communication component 1116 receives broadcast signals or broadcast-associated information from an external broadcast management system via a broadcast channel. In an example, the communication component 1116 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1100 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the method of the above first aspect. The method includes receiving a message carrying channel carrier configuration information sent by a base station, where the channel carrier configuration information indicates numerology/TTI configuration information for a logical channel; and determining each carrier mapped to the logical channel and a numerology/TTI configured for each carrier mapped to the logical channel, based on the channel carrier configuration information.

In an example, there is further provided a non-transitory computer-readable storage medium storing instructions, for example, a memory 1104 storing the instructions. The instructions are executed by the processor 1120 of the apparatus 1100 to perform the method of the above first aspect, including: receiving a message carrying channel carrier configuration information sent by a base station, where the channel carrier configuration information indicates numerology/TTI configuration information for a logical channel; and determining each carrier mapped to the logical channel and a numerology/TTI configured for each carrier mapped to the logical channel, based on the channel carrier configuration information. The non-transitory computer readable storage medium may be a Read Only Memory (ROM), a Random Access Memory (RAM), a CD-ROM, a magnetic tape, a floppy disk, and an optical data storage device and so on.

Figure 12:
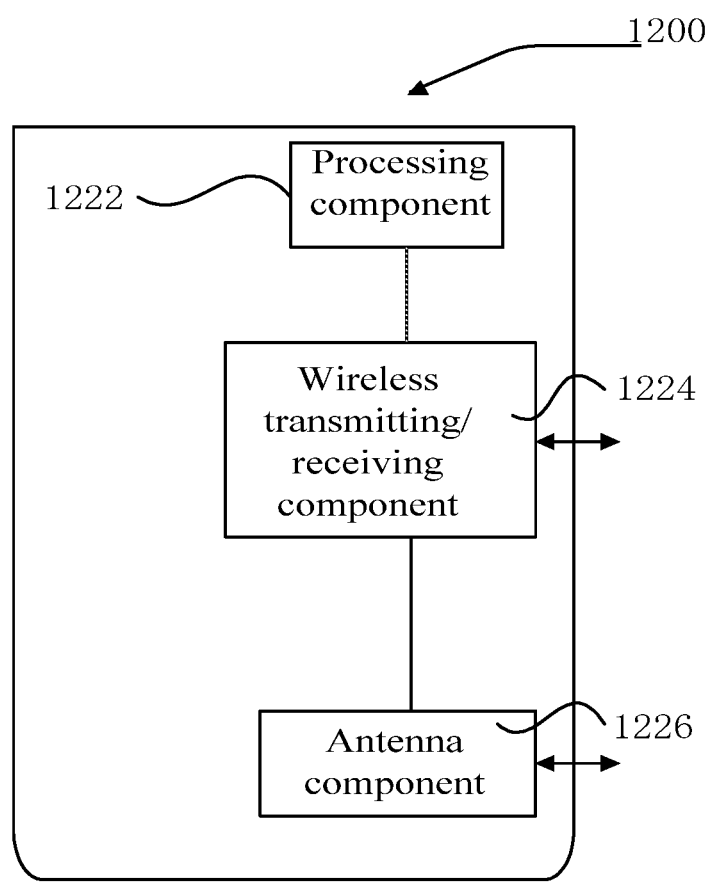
FIG. 12 is a block diagram illustrating an apparatus suitable for configuring a channel carrier, according to an example.

FIG. 12 is a block diagram illustrating an apparatus for configuring a channel carrier according to an example. An apparatus 1200 may be provided as a base station. As shown in FIG. 12, the apparatus 1200 includes a processing component 1222, a wireless transmission/receiving component 1224, an antenna component 1226, and a signal processing part specific to the wireless interface. The processing component 1222 may further include one or more processors.

One of the processors in the processing component 1222 can be configured to generate a message carrying channel carrier configuration information, wherein the channel carrier configuration information indicates numerology/TTI configuration information for a logical channel; and send the message to UE, where the message is configured for the UE to determine each carrier mapped to the logical channel and a numerology/TTI configured for each carrier mapped to the logical channel.

In an example, there is further provided a non-transitory computer-readable storage medium storing instructions. The above instructions are executed by the processing component 1222 of the apparatus 1200 to perform the above method of the above second aspect, including: generating a message carrying channel carrier configuration information, where the channel carrier configuration information indicates numerology/TTI configuration information for a logical channel; and sending the message to UE, where the message is configured for the UE to determine each carrier mapped to the logical channel and a numerology/TTI configured for each carrier mapped to the logical channel. The non-transitory computer readable storage medium may be a Read Only Memory (ROM), a Random Access Memory (RAM), a CD-ROM, a magnetic tape, a floppy disk, and an optical data storage device and so on.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as examples only, with a true scope and spirit of the present disclosure being indicated by the following claims.

It is to be understood that the present disclosure is not limited to the precise structure described above and shown in the accompanying drawings and that various modifications and changes may be made without departing from the scope thereof. The scope of the present disclosure is limited only by the appended claims.

What is claimed is:

1. A method comprising:
   receiving a first message, wherein the first message is a message carrying channel carrier configuration information sent by a base station, wherein the channel carrier configuration information indicates at least one of numerology or transmission time interval (TTI) configuration information for a logical channel; and
   determining at least one carrier mapped to the logical channel and at least a numerology or a TTI configured for at least one carrier mapped to the logical channel, based on the channel carrier configuration information;
   wherein receiving the first message comprises: receiving a Radio Resource Control (RRC) message carrying the channel carrier configuration information sent by the base station; and
   the method further comprises:
   when the RRC message is an RRC message instructing user equipment to switch to an inactive state, the RRC message further carries at least respective numerologies or TTIs configured for different carriers associated with the logical channel;
   determining a carrier for a cell when the user equipment in the inactive state resides in the cell; and
   determining at least a numerology or a TTI configured for the carrier for the cell with respect to the logical channel, based on the carrier for the cell.

2. The method according to claim 1, wherein determining at least one carrier mapped to the logical channel and at least the numerology or the TTI configured for at least one carrier mapped to the logical channel based on the channel carrier configuration information comprises:
   analyzing at least one carrier mapped to the logical channel and at least the numerology or the TTI configured for at least one carrier mapped to the logical channel, from the RRC message.

3. The method according to claim 1, the method further comprises:
   when the RRC message is the RRC message instructing the user equipment to switch to the inactive state, the RRC message further carries at least respective numerologies or TTIs configured for different carriers and different cells associated with the logical channel;
   determining a carrier for a cell and identification information of the cell when the user equipment in the inactive state resides in the cell; and
   determining at least a numerology or a TTI configured for the carrier for the cell with respect to the logical channel, based on the carrier for the cell and the identification information of the cell.

4. The method according to claim 1, wherein receiving the first message further comprises:
   receiving the first message with the channel carrier configuration information carried in a MAC control element.

5. The method according to claim 4, wherein determining at least one carrier mapped to the logical channel and at least the numerology or the TTI configured for at least one carrier mapped to the logical channel based on the channel carrier configuration information comprises:
   obtaining at least one carrier to which the logical channel is to be mapped, by analyzing contents of the MAC control element from a MAC protocol data unit in the first message; and
   updating the carrier mapped to the logical channel based on the carrier to which the logical channel is to be mapped.

6. The method according to claim 4, wherein determining at least one carrier mapped to the logical channel and at least the numerology or the TTI configured for at least one carrier mapped to the logical channel based on the channel carrier configuration information comprises:
   obtaining at least a numerology or a TTI to be configured for at least one carrier mapped to the logical channel, by analyzing contents of the MAC control element from a MAC protocol data unit of the first message; and
   updating at least the numerology or the TTI configured for at least one carrier mapped to the logical channel, based on at least the numerology or the TTI to be configured for the carrier.

7. The method according to claim 1, further comprising:
   receiving an UL grant message sent by the base station;
   analyzing, from the UL grant message, an allocated carrier and at least a numerology or a TTI configured for the allocated carrier; and
   determining uplink resource allocation information based on the allocated carrier, at least the numerology or the TTI configured for the allocated carrier, a locally-stored carrier mapped to the logical channel, and at least a locally-stored numerology or a locally-stored TTI configured for at least one carrier mapped to the logical channel.

8. A method comprising:
   generating a first message, wherein the first message is a message carrying channel carrier configuration information, wherein the channel carrier configuration information indicates at least one of numerology or transmission time interval (TTI) configuration information for a logical channel; and
   sending the first message to user equipment, wherein the first message is configured for the user equipment to determine at least one carrier mapped to the logical channel and at least a numerology or a TTI configured for at least one carrier mapped to the logical channel;
   wherein the first message comprises a Radio Resource Control (RRC) message; and
   wherein when the RRC message is an RRC message instructing user equipment to switch to an inactive state, the RRC message further carries at least respective numerologies or TTIs configured for different carriers associated with the logical channel, such that the user equipment determines a carrier for a cell when the user equipment in the inactive state resides in the cell, and determines at least a numerology or a TTI configured for the carrier for the cell with respect to the logical channel, based on the carrier for the cell.

9. The method according to claim 8, the method further comprises:
when the first message comprises the RRC message, the channel carrier configuration information comprises information on at least one carrier mapped to the logical channel and information on at least the numerology or the TTI configured for at least one carrier mapped to the logical channel.

10. The method according to claim 9, the method further comprises:
when the RRC message is an RRC message instructing the user equipment to switch to an inactive state, the RRC message further carries at least respective numerologies or TTIs configured for different carriers and different cells associated with the logical channel.

11. The method according to claim 8, wherein when the first message further comprises a MAC protocol data unit, the first message is generated by adding the channel carrier configuration information to a MAC control element of the first message.

12. The method according to claim 11, wherein the channel carrier configuration information comprises information on at least one carrier to which the logical channel is to be mapped or information on at least the numerology or the TTI configured for at least one carrier mapped to the logical channel.

13. The method according to claim 11, further comprising:
generating a UL grant message, wherein the UL grant message carries a carrier allocated to the user equipment and at least a numerology or a TTI configured for the allocated carrier; and
sending the UL grant message to the user equipment.

14. User equipment, comprising:
one or more processors; and
non-transitory computer-readable storage medium storing instructions executable by the one or more processors;
wherein the one or more processors are configured to:
receive a first message, wherein the first message is a message carrying channel carrier configuration information sent by a base station, wherein the channel carrier configuration information indicates at least one of numerology or transmission time interval (TTI) configuration information for a logical channel; and
determine at least one carrier mapped to the logical channel and at least a numerology or a TTI configured for at least one carrier mapped to the logical channel, based on the channel carrier configuration information;
wherein receiving the first message comprises: receiving a Radio Resource Control (RRC) message carrying the channel carrier configuration information sent by the base station; and
the one or more processors are further configured to:
when the RRC message is an RRC message instructing user equipment to switch to an inactive state, the RRC message further carries at least respective numerologies or TTIs configured for different carriers associated with the logical channel;
determine a carrier for a cell when the user equipment in the inactive state resides in the cell; and
determine at least a numerology or a TTI configured for the carrier for the cell with respect to the logical channel, based on the carrier for the cell.

15. The user equipment according to claim 14, wherein receiving the first message further comprises:
receiving the first message with the channel carrier configuration information carried in a MAC control element.

16. The user equipment according to claim 14, further comprising:
receiving a UL grant message sent by the base station;
analyzing, from the UL grant message, an allocated carrier and at least a numerology or a TTI configured for the allocated carrier; and
determining uplink resource allocation information based on the allocated carrier, at least the numerology or the TTI configured for the allocated carrier, a locally-stored carrier mapped to the logical channel, and at least a locally-stored numerology or a locally-stored TTI configured for at least one carrier mapped to the logical channel.

17. A base station, comprising:
one or more processors; and
a non-transitory computer-readable storage medium storing instructions executable by the one or more processors;
wherein the one or more processors are configured to:
generate a first message, wherein the first message is a message carrying channel carrier configuration information, wherein the channel carrier configuration information indicates at least one of numerology or TTI configuration information for a logical channel; and
send the first message to user equipment, wherein the first message is configured for the user equipment to determine at least one carrier mapped to the logical channel and at least a numerology or a TTI configured for at least one carrier mapped to the logical channel;
wherein the first message comprises a Radio Resource Control (RRC) message; and
wherein when the RRC message is an RRC message instructing user equipment to switch to an inactive state, the RRC message further carries at least respective numerologies or TTIs configured for different carriers associated with the logical channel, such that the user equipment determines a carrier for a cell when the user equipment in the inactive state resides in the cell, and determines at least a numerology or a TTI configured for the carrier for the cell with respect to the logical channel, based on the carrier for the cell.

18. The base station according to claim 17, wherein, when the first message comprises the RRC message, the channel carrier configuration information comprises:
information on at least one carrier mapped to the logical channel and information on at least the numerology or the TTI configured for at least one carrier mapped to the logical channel.

19. The base station according to claim 18, wherein, when the RRC message is an RRC message instructing the user equipment to switch to an inactive state, the RRC message further carries at least respective numerologies or TTIs configured for different carriers and different cells associated with the logical channel.

20. The base station according to claim 17, wherein when the first message further comprises a MAC protocol data unit, generating the first message carrying the channel carrier configuration information comprises:
obtaining the first message by adding the channel carrier configuration information to a MAC control element of the first message.

21. The base station according to claim 20, wherein the channel carrier configuration information comprises information on at least one carrier to which the logical channel is to be mapped or information on at least the numerology or the TTI configured for at least one carrier mapped to the logical channel.

22. The base station according to claim 20, the one or more processors are further configured to:
   generate a UL grant message, wherein the UL grant message carries a carrier allocated to the user equipment and at least a numerology or a TTI configured for the allocated carrier; and
   send the UL grant message to the user equipment.

\* \* \* \* \*